US012744298B2

(12) United States Patent
Faridani et al.

(10) Patent No.: US 12,744,298 B2
(45) Date of Patent: Sep. 22, 2026

(54) DUAL-MODE WAVEGUIDE POWER DIVIDER

(71) Applicant: HUAWEI TECHNOLOGIES CO., LTD., Shenzhen (CN)

(72) Inventors: Mohammad Faridani, Ottawa (CA); Hari Krishna Pothula, Stittsville (CA); David Neal Wessel, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 97 days.

(21) Appl. No.: 18/962,907

(22) Filed: Nov. 27, 2024

(65) Prior Publication Data

US 2026/0149159 A1 May 28, 2026

(51) Int. Cl.
*H01P 5/12* (2006.01)
*H01Q 21/00* (2006.01)

(52) U.S. Cl.
CPC ........... *H01P 5/12* (2013.01); *H01Q 21/0006* (2013.01)

(58) Field of Classification Search
CPC .............................. H01P 5/12; H01Q 21/0006
See application file for complete search history.

(56) References Cited

U.S. PATENT DOCUMENTS

2020/0201946 A1* 6/2020 Zhang ..................... G06F 30/00
2023/0318200 A1* 10/2023 Wang ..................... H01Q 21/08 343/700 R
2023/0344106 A1* 10/2023 Crouch ..................... H01P 5/12

OTHER PUBLICATIONS

J. L. Cano, A. Mediavilla, S. Draga, and A. Tazon, "Novel Broadband Circular Waveguide Four-Way Power Divider for Dual Polarization Applications", IEEE Microwave and Wireless Components Letters, Feb. 2016, pp. 98-100, vol. 26, No. 2.

R. Haro-Baez, D. Cisneros-Bustillos, and D. S. Benitez, "T-junction Power Divider design based on Corporate Feeding Network in Square Waveguide Technology", 2021 SBMO/IEEE MTT-S International Microwave and Optoelectronics Conference (IMOC), Oct. 2021.

N. J. G. Fonseca, D. Petrolati, and P. Angeletti, "Design of a Waveguide Dual-Mode Three-Way Power Divider for Dual-Polarization Beam Forming Networks at Ka-Band", 2013 IEEE Antennas and Propagation Society International Symposium (APSURSI), Jul. 2013.

(Continued)

*Primary Examiner* — Quan Tra

(57) ABSTRACT

Waveguide power dividers capable of splitting a dual-mode electromagnetic signal into at least two output signals with differing amounts of horizontal and vertical polarization states are disclosed herein. The waveguide power dividers comprise an input port for receiving an input electromagnetic signal, a main output port for emitting a main output electromagnetic signal, and a subsidiary output port for emitting a subsidiary output electromagnetic signal. A main waveguide extends between the input port and the main output port and a subsidiary waveguide extends between the subsidiary output port and first and second connection points with the main waveguide. A horizontal polarizer regulates the distribution of horizontal polarized signal between the main output port and subsidiary output port and a vertical polarizer regulates the distribution of vertical polarized signal between the main output port and subsidiary output port. The waveguide power dividers disclosed herein may be used in array antennas.

20 Claims, 8 Drawing Sheets

(56) References Cited

OTHER PUBLICATIONS

J. L. Cano, A. Mediavilla, S. Dragas, and A. Tazon, "Novel Square-Waveguide Dual-Mode Two-Way Reactive Power Divider", IEEE Transactions on Microwave Theory and Techniques, Mar. 2020, pp. 980-986, vol. 68, No. 3.

"Cables, coaxial cable, cable connectors, adapters, attenuators, microwave parts", Pastenack (n.d.), https://www.pasternack.com/nsearch.aspx?keywords=Waveguide%20Power%20Divider&view_type=grid.

"2 way WR-22 waveguide power divider UG round cover flange from 36.7 GHz to 40 ghz, brass", Pasternack (n.d.), https://www.pasternack.com/pew22dv001-p.aspx.

"2 way WR-51 waveguide power divider UG Square cover flange from 17.7 GHz to 21.2 GHz, aluminum", Pasternack (n.d.), https://www.pasternack.com/pew51dv001-p.aspx.

* cited by examiner

DUAL-MODE WAVEGUIDE POWER DIVIDER

TECHNICAL FIELD

The present disclosure relates to waveguides, and in particular to dual-mode waveguide power dividers capable of unequal power distribution and array antennas using the same.

BACKGROUND

Waveguide power dividers are essential components in microwave and millimeter-wave systems, used to split or combine power (i.e. electromagnetic signal) input into the power divider across different output ports while minimizing loss and ensuring efficient power distribution. Dual-mode waveguide power dividers utilize two different electromagnetic wave modes, for example, vertical and horizontal polarization states. Traditional power dividers are typically designed for uniform power splitting, distributing equal power among the output ports.

Modern applications such as radar, communication systems, and sensor networks often require waveguide power dividers having power distribution characteristics which meet specific design needs. To improve the capabilities of these and other systems, improved waveguide power dividers are desirable, having the capacity to split power in a wide range of manners.

SUMMARY

The present disclosure provides waveguide power dividers capable of splitting a dual-mode input electromagnetic (EM) signal (comprising a vertical mode and a horizontal mode) to produce at least two output signals with distinct power ratios for each mode.

In an aspect, the present disclosure provides a waveguide power divider comprising: (a) an input port for receiving an input electromagnetic (EM) signal comprising a horizontal polarization state and a vertical polarization state; (b) a main output port for emitting a main output EM signal; (c) a main waveguide extending between the input port and the main output port, the main waveguide for transmitting a first portion of the horizontal polarization state and a first portion of the vertical polarization state from the input port to the main output port, the main waveguide comprising a square cross-section; (d) a subsidiary output port for emitting a subsidiary output EM signal; (e) a subsidiary waveguide connected to the main waveguide at a first connection point and at a second connection point, the subsidiary waveguide extending between the first connection point, the second connection point, and the subsidiary output port; (f) a first horizontal polarizer for permitting passage of a second portion of the horizontal polarization state from the first connection point to the subsidiary output port and for preventing passage of the vertical polarization state from the first connection point to the subsidiary output port; and (g) a first vertical polarizer for permitting passage of a second portion of the vertical polarization state from the second connection point to the subsidiary output port and for preventing passage of the horizontal polarization state from the second connection point to the subsidiary output port.

In an aspect of any one of the waveguide power dividers disclosed herein, when the input port receives the input EM signal: the first portion of the horizontal polarization state and the first portion of the vertical polarization state are emitted out of the main output port as the main output EM signal; the second portion of the horizontal polarization state and the second portion of the vertical polarization state are emitted out of the subsidiary output port as the subsidiary output EM signal; and the main output EM signal and the subsidiary output EM signal comprise a respective power that differ from one another.

In an aspect of any one of the waveguide power dividers disclosed herein, the first portion of the horizontal polarization state and the second portion of the horizontal polarization state each comprise a respective amplitude that differ from one another.

In an aspect of any one of the waveguide power dividers disclosed herein, the first portion of the vertical polarization state and the second portion of the vertical polarization state each comprise a respective amplitude that differ from one another.

In an aspect of any one of the waveguide power dividers disclosed herein, the first and second portions of the horizontal and vertical polarization states each comprise a respective amplitude and the ratio of the amplitudes of the first and second portions of the horizontal polarization state differs from the ratio of the amplitudes of the first and second portions of the vertical polarization state.

In an aspect of any one of the waveguide power dividers disclosed herein, the first horizontal polarizer comprises an area, the first and second portions of the horizontal polarization state each comprise a respective amplitude, and the ratio of the respective amplitudes of the first and second portions of the horizontal polarization state is determined, at least in part, by the area of the first horizontal polarizer.

In an aspect of any one of the waveguide power dividers disclosed herein, the first vertical polarizer comprises an area, the first and second portions of the vertical polarization state each comprise a respective amplitude, and the ratio of the respective amplitudes of the first and second portions of the vertical polarization state is determined, at least in part, by the area of the first vertical polarizer.

In an aspect of any one of the waveguide power dividers disclosed herein, when the input port receives the input EM signal: the second portion of the horizontal polarization state passes through the first horizontal polarizer to a junction in the subsidiary waveguide, the second portion of the vertical polarization state passes through the first vertical polarizer to the junction in the subsidiary waveguide, and the second portion of the horizontal polarization state and the second portion of the vertical polarization state merge at the junction and are emitted out the subsidiary output port as the subsidiary output EM signal. This aspect of the waveguide power divider may be further particularized. In a first particularization, the second portions of the horizontal and vertical polarization states each travel a respective same distance from the input port to the junction and the subsidiary output EM signal comprises a horizontal phase slope and a vertical phase slope that are identical. In a second particularization, the first horizontal polarizer occupies the first connection point, the first vertical polarizer occupies the second connection point, and the subsidiary waveguide further comprises: a first branch extending between the first connection point and a first intersection with the junction, a second branch extending between the second connection point and a second intersection with the junction, a second horizontal polarizer occupying the first intersection, the second horizontal polarizer for preventing the second portion of the vertical polarization state from passing into the first branch, and a second vertical polarizer occupying the second intersection, the second vertical polarizer for preventing the second portion of the horizontal polarization state from passing into the second branch.

In an aspect of the any of the waveguide power dividers disclosed herein, the first horizontal polarizer is a wire grid.

In an aspect of the any of the waveguide power dividers disclosed herein, the first vertical polarizer is a portion of the subsidiary waveguide comprising a rectangular waveguide.

In an aspect of the any of the waveguide power dividers disclosed herein, the input EM signal comprises a frequency between about 9 kilohertz to about 300 gigahertz.

In an aspect of the any of the waveguide power dividers disclosed herein, the waveguide power divider comprises an S11 parameter less than or equal to about −15 decibels.

In an aspect, any one of the waveguide power dividers disclosed herein comprises an H-plane S31 parameter and an H-plane S21 parameter, a V-plane S31 parameter and a V-plane S21 parameter, the first horizontal polarizer and the first vertical polarizer each comprise a respective area, the H-plane S31 parameter and H-plane S21 parameter depend on the area of the first horizontal polarizer, and the V-plane S31 parameter and V-plane S21 parameter depend on the area of the first vertical polarizer.

In an aspect of any one of the waveguide power divider disclosed herein, the input port faces a first direction and the main and subsidiary output ports face a second direction opposite the first direction.

In an aspect, any one of the waveguide power divider disclosed herein is manufactured as a single component using a three-dimensional metal printer.

In an aspect, the present disclosure provides a communication system (for example, an array antenna) comprising at least one of the waveguide power divider according to any one of above aspects and implementation.

Other aspects and implementations of the disclosure are evident in view of the detailed description provided herein.

BRIEF DESCRIPTION OF THE FIGURES

Further advantages, permutations, and combinations of the invention will become apparent from the following detailed description of the various illustrative embodiments of the invention taken together with the accompanying drawings, each of which are intended to be non-limiting, in which.

DETAILED DESCRIPTION

Advantageously, waveguide power dividers disclosed herein can split a dual-mode input electromagnetic (EM) signal (comprising a vertical mode and a horizontal mode) to produce two output signals with distinct power ratios for each mode. The waveguide power dividers disclosed herein split the vertical polarized power independently of the horizontal polarized power. Therefore, the waveguide power dividers may produce a wide range of unique output signals that may be useful in a variety of applications, for example, the waveguide power dividers disclosed herein may be used as part of an array antenna to produce unique radiation patterns.

Reference will now be made in detail to exemplary embodiments of the disclosure, wherein numerals refer to like components, examples of which are illustrated in the accompanying drawings that further show exemplary embodiments, without limitation.

Figure 1:
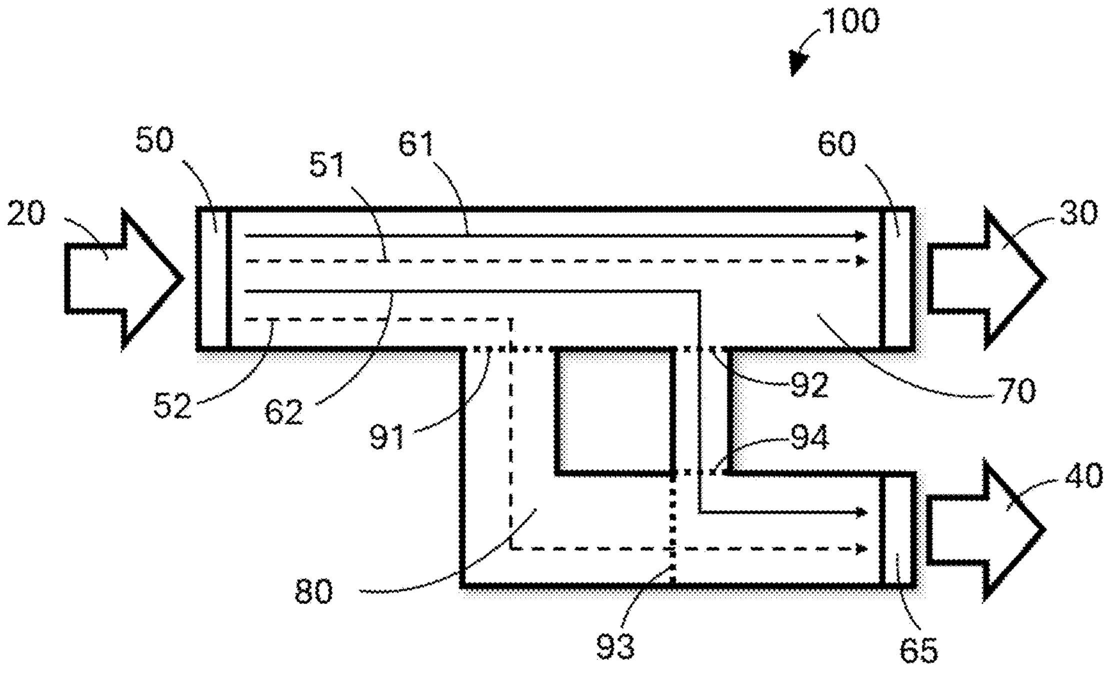
FIG. 1 shows a high-level schematic diagram of a waveguide power divider according to some embodiments of the present disclosure.

FIG. 1 shows a high-level schematic diagram of a waveguide power divider 100 according to embodiments of the present disclosure. Waveguide power divider 100 comprises three ports: an input port 50 for receiving an input electromagnetic (EM) signal 20, a main output port 60 for emitting a main output EM signal 30, and a subsidiary output port 65 for emitting a subsidiary output EM signal 40.

Input port 50 is connected to main output port 60 via a main waveguide 70. As described in greater detail below, main waveguide 70 transmits a portion of the input EM signal 20 from input port 50 to main output port 60. A subsidiary waveguide 80 is connected to main waveguide 70 at two connection points. In the exemplary embodiment shown in FIG. 1, the subsidiary waveguide 80 is connected to main waveguide 70 at a first connection point at around the location of first horizontal polarizer 91 and at a second connection point at around the location of first vertical polarizer 92.

In the exemplary waveguide power divider 100, the first connection point between main waveguide 70 and subsidiary waveguide 80 is located more proximal to the input port 50 as compared to second connection point between main waveguide 70 and subsidiary waveguide 80, however, this need not be the case. A skilled person will appreciate that the first and second connection points may be located anywhere along the main waveguide 70. Moreover, the main waveguide 70 is a three-dimensional structure and first and second connection points may both be positioned an equal distance from input port 50.

Input electromagnetic (EM) signal 20 comprises a horizontal polarization state and a vertical polarization state. A horizontal polarization state is a linear polarized EM wave having an electric field that oscillates in a horizontal plane (H-plane). Similarly, a vertical polarization state is a linear polarized EM wave having an electric field that oscillates in a vertical plane (V-plane). For the purposes of this disclosure, the H-plane and V-plane are in reference to the waveguide power divider 100 (rather than some other reference point such as the surface of the Earth). The waveguide power divider 100 may be oriented in a wide range of x, y, z coordinates in the three-dimensional world. In other words, the horizontal polarization state (aka the “TE01 mode” or the “horizontal mode”) and the vertical polarization state (aka the “TE10 mode” or the “vertical mode”) are two linear polarization states that are orthogonal with respect to each other and that each exist within (at least) the main waveguide 70.

A first portion of horizontal polarization state 51 of input EM signal 20 and a first portion of vertical polarization state 61 of input EM signal 20 is transmitted from input port 50 to main output port 60, through main waveguide 70. Accordingly, the first portion of horizontal polarization state 51 of input EM signal 20 and the first portion of vertical polarization state 61 of input EM signal 20 form part of main output EM signal 30.

The main waveguide 70 has a square cross-section. The term “square cross-section” as used throughout this disclosure should be understood to mean substantially a square cross-section which may not be perfectly square depending on manufacturing tolerances and/or manufacturing defects. A waveguide comprising a square cross-section is capable of propagating an EM signal comprising both horizontal and vertical polarization states therethrough.

The first portion of horizontal polarization state 51 of input EM signal 20 is a fraction of the horizontal polarization state of the input EM signal 20. For example, first portion of horizontal polarization state 51 of input EM signal 20 may be about 1% to about 99% of the total horizontal polarization state of the input EM signal 20.

The first portion of vertical polarization state 61 of input EM signal 20 is a fraction of the vertical polarization state of the input EM signal 20. For example, first portion of vertical polarization state 61 of input EM signal 20 may be about 1% to about 99% of the total vertical polarization state of the input EM signal 20.

The subsidiary waveguide 80 extends between the first connection point with main waveguide 70, the second connection point with main waveguide 70, and the subsidiary output port 65. A second portion of the horizontal polarization state 52 of input EM signal 20 and a second portion of the vertical polarization state 62 of input EM signal 20 are transmitted from input port 50 to subsidiary output port 65, through subsidiary waveguide 80. Accordingly, the second portion of horizontal polarization state 52 of input EM signal 20 and the second portion of vertical polarization state 62 of input EM signal 20 form part of subsidiary output EM signal 40.

In the exemplary embodiment shown in FIG. 1, the second portion of horizontal polarization state 52 of input EM signal 20 propagates from input port 50 to subsidiary output port 65 through the first connection point between main waveguide 70 and subsidiary waveguide 80. Furthermore, in the exemplary embodiment shown in FIG. 1, the second portion of vertical polarization state 62 of input EM signal 20 propagates from input port 50 to subsidiary output port 65 through the second connection point between main waveguide 70 and subsidiary waveguide 80.

Horizontal and vertical polarizers placed within subsidiary waveguide 80 cause the second portion of horizontal polarization state 52 to propagate through the first connection point (between main waveguide 70 and subsidiary waveguide 80) to subsidiary output port 65 and cause the second portion of vertical polarization state 62 to propagate through the second connection point (between main waveguide 70 and subsidiary waveguide 80) to subsidiary output port 65.

For example, in the exemplary illustrated embodiment shown in FIG. 1, first and second horizontal polarizers 91, 93 are located in a portion of subsidiary waveguide 70 connected to the first connection point and first and second vertical polarizers 92, 94 are located in a portion of subsidiary waveguide 70 connected to the second connection point.

The purpose of first and second horizontal polarizers 91, 93 is to allow the passage of horizontal polarized EM signal therethrough and entirely or substantially prevent passage of vertical polarized EM signal therethrough. The purpose of first and second vertical polarizers 92, 94 is to allow the passage of vertical polarized EM signal therethrough and entirely or substantially prevent passage of horizontal polarized EM signal therethrough.

As shown in FIG. 1, first horizontal polarizer 91 permits a second portion of the horizontal polarization state 52 of input EM signal 20 to propagate from input port 50, through the first connection point (between main waveguide 70 and subsidiary waveguide 80), and to the subsidiary output port 65. First horizontal polarizer 91 entirely or substantially blocks passage of the vertical mode. As described in greater detail elsewhere in this disclosure, the power ratio between the first portion of horizontal polarization state 51 and the second portion of horizontal polarization state 52 depends, at least in part, on the properties (including the geometry) of the first horizontal polarizer 91 and the angle of the first connection point with respect to the input port 50.

As shown in FIG. 1, first vertical polarizer 92 permits a second portion of the vertical polarization state 62 of input EM signal 20 to propagate from input port 50, through the second connection point (between main waveguide 70 and subsidiary waveguide 80), and to the subsidiary output port 65. First vertical polarizer 92 entirely or substantially blocks passage of the horizontal mode. As described in greater detail elsewhere in this disclosure, the power ratio between the first portion of vertical polarization state 61 and the second portion of vertical polarization state 62 depends, at least in part, on the properties (including the geometry) of the first vertical polarizer 92 and the angle of the second connection point with respect to the input port 50.

In the exemplary waveguide power divider 100 shown in FIG. 1, first horizontal polarizer 91 is positioned within subsidiary waveguide 80 at approximately the same location as the first connection point between main waveguide 70 and subsidiary waveguide 80. Furthermore, in the exemplary waveguide power divider 100 shown in FIG. 1, first vertical polarizer 92 is positioned within subsidiary waveguide 80 at approximately the same location as the second connection point between main waveguide 70 and subsidiary waveguide 80. However, a skilled person will appreciate that the first horizontal polarizer 91 and the first vertical polarizer 92 need not be located precisely at the first and second connection points, respectively.

Rather, to satisfy the purpose of permitting passage of a second portion of the horizontal polarization state 52 from the first connection point (between main waveguide 70 and subsidiary waveguide 80) to the subsidiary output port 65, the first horizontal polarizer 91 may be positioned along various portions of subsidiary waveguide 80 so long as the first horizontal polarizer 91 does not prevent the second portion of vertical polarization state 62 of input EM signal 20 from being transmitted to subsidiary output port 65. Likewise, to satisfy the purpose of permitting passage of a second portion of the vertical polarization state 62 from the second connection point (between main waveguide 70 and subsidiary waveguide 80) to the subsidiary output port 65, the first vertical polarizer 92 may be positioned along various portions of subsidiary waveguide 80 so long as the first vertical polarizer 92 does not prevent the second portion of horizontal polarization state 52 of input EM signal 20 from being transmitted to subsidiary output port 65.

A skilled person will appreciate that the properties (including the geometry) of the first horizontal polarizer 91 may be tailored to regulate the quantity of the second portion of horizontal polarization state 52 transmitted from the first connection point (between main waveguide 70 and subsidiary waveguide 80) to the subsidiary output port 65. Likewise, a skilled person will appreciate that the properties (including the geometry) of the first vertical polarizer 92 may be tailored to regulate the quantity of the second portion of vertical polarization state 62 transmitted from the second connection point (between main waveguide 70 and subsidiary waveguide 80) to the subsidiary output port 65. Furthermore, the second portion of horizontal polarization state 52 and the second portion of vertical polarization state 62 are emitted out of subsidiary output port 65 as a subsidiary output EM signal 40, therefore, a skilled person will appreciate not position first horizontal polarizer 91 at a location that will block second portion of vertical polarization state 62 from being emitted out of subsidiary output port 65 and will also appreciate not position first vertical polarizer 92 at a location that will block second portion of horizontal polarization state 52 from being emitted out of subsidiary output port 65.

In embodiments, waveguide power dividers disclosed herein comprise a single horizontal polarizer (e.g., first horizontal polarizer 91) and a single vertical polarizer (e.g., first vertical polarizer 92). Accordingly, despite the nomenclature of "first" horizontal polarizer and "first" vertical polarizer, in some embodiments, no "second" horizontal or vertical polarizers may be present in the waveguide power divider 100.

In the exemplary illustrated embodiment shown in FIG. 1, waveguide power divider 100 has a second horizontal polarizer 93 and a second vertical polarizer 94. In the exemplary embodiment, the subsidiary waveguide 80 of waveguide power divider 100 has two branches: a first branch extending from the first connection point (between main waveguide 70 and subsidiary waveguide 80) to a junction of the first and second branches (located around the second horizontal polarizer 93 and the second vertical polarizer 94) and a second branch extending from the second connection point (between main waveguide 70 and subsidiary waveguide 80) to the junction of the first and second branches. As shown in FIG. 1, at the junction of the first and second branches of subsidiary waveguide 80, the second portion of horizontal polarization state 52 and the second portion of vertical polarization state 62 merge into subsidiary output EM signal 40, which is then emitted out of subsidiary output port 65.

In the exemplary embodiment shown in FIG. 1, the second horizontal polarizer 93 occupies the point at which the first branch of subsidiary waveguide 80 intersects the junction of the first and second branches of subsidiary waveguide 80. The purpose of the second horizontal polarizer 93 is to prevent the second portion of vertical polarization state 62 from propagating into the first branch of subsidiary waveguide 80. In other words, as the second portion of vertical polarization state 62 passes through the second connection point (between main waveguide 70 and subsidiary waveguide 80), second horizontal polarizer 93 will block second portion of vertical polarization state 62 from propagating back towards the main waveguide 70 (via the first branch of subsidiary waveguide 80).

In the exemplary embodiment shown in FIG. 1, the second vertical polarizer 94 occupies the point at which the second branch of subsidiary waveguide 80 intersects the junction of the first and second branches of subsidiary waveguide 80. The purpose of the second vertical polarizer 94 is to prevent the second portion of horizontal polarization state 52 from propagating into the second branch of subsidiary waveguide 80. In other words, as the second portion of horizontal polarization state 52 passes through the first connection point (between main waveguide 70 and subsidiary waveguide 80), second vertical polarizer 94 will block second portion of horizontal polarization state 52 from propagating back towards the main waveguide 70 (via the second branch of subsidiary waveguide 80).

In embodiments containing a second horizontal polarizer 93, a skilled person will appreciate that the second horizontal polarizer 93 may be positioned along various portions of subsidiary waveguide 80 so long as the second horizontal polarizer 93 does not prevent the second portion of the vertical polarization state 62 of input EM signal 20 from being transmitted to subsidiary output port 65. In a similar vein, in embodiments containing a second vertical polarizer 94, a skilled person will appreciate that the second vertical polarizer 94 may be positioned along various portions of subsidiary waveguide 80 so long as the second vertical polarizer 94 does not prevent the second portion of horizontal polarization state 52 of input EM signal 20 from being transmitted to subsidiary output port 65.

As discussed above, subsidiary waveguide 80 of the exemplary waveguide power divider 100 shown in FIG. 1 has two branches. A skilled person will appreciate that, in some embodiments, subsidiary waveguide 80 may not have any branches. For example, first and second connection points may comprise part of a larger singular linkage point between main waveguide 70 and subsidiary waveguide 80. In this configuration, a first portion of the larger singular linkage point (i.e. the first connection point between main waveguide 70 and subsidiary waveguide 80) may comprise a first horizontal polarizer 91 and a second portion of the larger singular linkage point (i.e. the second connection point between main waveguide 70 and subsidiary waveguide 80) may comprise a first vertical polarizer 92. For example, a first horizontal polarizer 91 may occupy from about 1% to about 99% of the larger singular linkage point (i.e. the first connection point) with the remaining percentage of the larger singular linkage point (i.e. the second connection point) being occupied by first vertical polarizer 92. In this embodiment, second portion of horizontal polarization state 52 and second portion of vertical polarization state 62 merge immediately after passing through the first horizontal polarizer 91 and the first vertical polarizer 92, respectively, to form subsidiary output EM signal 40. In contrast, in the branched design shown in the exemplary embodiment of FIG. 1, the second portion of horizontal polarization state 52 and second portion of vertical polarization state 62 merge at the junction of the first and second branches of subsidiary waveguide 80, which, in the exemplary embodiment, is a distance away from the first horizontal polarizer 91 and the first vertical polarizer 92.

The first and second connection points between the main waveguide 70 and the subsidiary waveguide 80 of the exemplary waveguide power divider 100 shown in FIG. 1 each comprise respective openings and each of these openings comprises a respective plane, both of which are perpendicular to the plane in which the opening of input port 50 exists. In other words, the first and second branches of subsidiary waveguide 80 are connected at right angles with respect to main waveguide 70. Furthermore, in the exemplary embodiment, the opening of main output port 60 comprises a plane that is parallel to the plane of the opening of input port 50 and main waveguide 70 is a straight transmission line. Due to this configuration, main output EM signal 30 is relatively stronger (more powerful) as compared to subsidiary output EM signal 40 in the exemplary waveguide power divider 100 shown in FIG. 1.

A skilled person will appreciate that the first and second branches of subsidiary waveguide 80 are able to receive more EM signal if the plane of the openings of first and second connection points between the main waveguide 70 and the subsidiary waveguide 80 face towards the plane of the opening of input port 50. Therefore, adjusting the angle at which the subsidiary waveguide 80 is connected to the main waveguide 70 (at first and second connection points) will impact the amount of input EM signal 20 to which the first and second connection points are exposed, thereby affecting the power ratio between the main output EM signal 30 and subsidiary output EM signal 40.

A skilled person will appreciate that the main waveguide 70 and subsidiary waveguide 80 (and any branches thereof, if any) may be arranged in a wide range of angles with respect to input port 50, main output port 60, and subsidiary output port 65, so long as when input port 50 receives an input EM signal 20, main output port 60 is capable of emitting a main output EM signal 30 and subsidiary output port 65 is capable of emitting a subsidiary output EM signal 40. A skilled person will further appreciate that main waveguide 70 and subsidiary waveguide 80 may comprise twists and turns. In light of the present disclosure, a skilled person is capable of designing a waveguide power divider 100 to satisfy a wide range of performance requirements.

As discussed in greater detail elsewhere in this disclosure, the size and the geometry of portions of the subsidiary waveguide 80 that connect to main waveguide 70 (at first and second connection points) will also impact the ratio of power between the main output EM signal 30 and subsidiary output EM signal 40.

In embodiments, altering the geometry of a portion of the subsidiary waveguide 80 can cause the altered portion to behave as a polarizer. For example, in embodiments, the second branch of subsidiary waveguide 80 (i.e. the portion of subsidiary waveguide 80 between the first vertical polarizer 92 and the second vertical polarizer 94) may be a rectangular waveguide, having a greater width than height. A skilled person will appreciate that a rectangular waveguide may act as a vertical polarizer, permitting propagation of the TE10 mode (vertical mode) and not the TE01 mode (horizontal mode).

A skilled person will appreciate that various types of polarizers may be used with the present invention. For example, polarizers 91, 92, 93, 94 may be thin film polarizers or wire grid polarizers.

A skilled person will appreciate how to configure (or select) a wire grid polarizer (including the spacing between the plurality of wires and the thickness of the plurality of wires that comprise a wire grid polarizer) to function effectively as a polarizer for the wavelength of the given EM signal for which the waveguide power divider 100 is designed for operation.

In embodiments, waveguide power divider 100 may comprise more than two horizontal polarizers and/or more than two vertical polarizers.

The purpose of polarizers 91, 92, 93, 94 is to block a first linear polarization state from passing through the polarizer while allowing a second linear polarization state to pass through the polarizer, the second linear polarization state being orthogonal to the first linear polarization state. However, practically, some amount of EM power may be absorbed by the polarizers 91, 92, 93, 94. Furthermore, the main waveguide 70 and subsidiary waveguide 80 may also absorb a small amount of EM signal. Accordingly, in embodiments, not all the input EM signal 20 will be distributed to main output port 60 and subsidiary output port 65. Some horizontal polarizers may not be able to entirely block the passage of a vertical mode therethrough and some vertical polarizers may not be able to entirely block the passage of a horizontal mode therethrough. Accordingly, as used throughout this disclosure, the terms "preventing passage" or "blocking passage" (or the like) of a given polarization state should be understood to include "substantially preventing" and "substantially impeding" the passage of given polarization state through a polarizer.

As mentioned earlier, in the exemplary waveguide power divider 100 shown in FIG. 1, the second portion of the horizontal polarization state 52 of input EM signal 20 and second portion of the vertical polarization state 62 of input EM signal 20 merge together inside subsidiary waveguide 80 to form subsidiary output EM signal 40 at the junction of the first and second branches of subsidiary waveguide 80. Subsidiary output EM signal 40 is then emitted out of subsidiary output port 65. In the exemplary embodiment, second portion of horizontal polarization state 52 and second portion of vertical polarization state 62 travel and an equal distance (albeit via different pathways) to the junction of the first and second branches of subsidiary waveguide 80. Accordingly in the exemplary waveguide power divider 100 shown in FIG. 1, subsidiary output EM signal 40 comprises a horizontal phase slope and a vertical phase slope that are identical. In other embodiments, second portion of horizontal polarization state 52 and second portion of vertical polarization state 62 travel different distances, via different pathways, to the junction of the first and second branches of subsidiary waveguide 80, and subsidiary output EM signal 40 comprises a horizontal phase slope and a vertical phase slope that are not identical.

Waveguide power divider 100 may be constructed from any suitable material for propagation EM signals therethrough. For example, waveguide power divider 100 may be constructed from various metals with low resistivity such as: brass, copper, silver, aluminum, or any combination thereof. A skilled person is aware of other suitable materials from which to construct waveguide power divider 100. In embodiments, waveguide power divider 100 is constructed from plastic and is plated with metal, for example, gold. In embodiments, main waveguide 70 and subsidiary waveguide 80 are constructed as separate connectable components. In embodiments, waveguide power divider 100 may be fabricated using a 3D printer (as a single component or as multiple separate components).

In an embodiment, waveguide power divider 100 is designed for propagating EM signals comprising a frequency from anywhere between about 9 kilohertz to about 300 gigahertz. A skilled person will appreciate that the size of main waveguide 70 and subsidiary waveguide 80 will be dictated by the wavelength size of the EM signal for which the waveguide power divider 100 is designed to propagate.

Advantageously, waveguide power divider 100 may be manufactured to emit a main output EM signal 30 and a subsidiary output EM signal 40 comprising arbitrary horizontal power ratios and/or arbitrary vertical power ratios. For example, by altering the geometry (e.g., dimensions) of the subsidiary waveguide 80 in which the first horizontal polarizer 91 and first vertical polarizer 92 reside, manufacturers may selectively and separately control the amount to horizontal polarization state and vertical polarization state distributed to main output port 60 and subsidiary output port 65.

For example, a manufacturer may design the first connection point between main waveguide 70 and subsidiary waveguide 80 with a specified width to control the amount of power transferred from main waveguide 70 and subsidiary waveguide 80. In embodiments where subsidiary waveguide 80 comprises first and second branches, a manufacturer may design any portion of the first branch of subsidiary waveguide 80 with a specified width to control the amount of horizontal power transferred from main waveguide 70 to subsidiary waveguide 80. The amount of horizontal mode power transferred from main waveguide 70 to subsidiary waveguide 80 also depends on the angle of the first connection point with respect to the input port 50. Subject to any absorption of energy by the components of the waveguide power divider 100 and/or low amounts of horizontal polarization state that may pass through the vertical polarizers, any horizontal mode power that is not directed towards subsidiary output port 65 will be directed towards main output port 60 (and vice versa).

Likewise, a manufacturer may design the second connection point between main waveguide 70 and subsidiary waveguide 80 with a specified height to control the amount of power transferred from main waveguide 70 and subsidiary waveguide 80. In embodiments where subsidiary waveguide 80 comprises first and second branches, a manufacturer may design any portion of the second branch of subsidiary waveguide 80 with a specified height to control the amount of vertical mode power transferred from main waveguide 70 to subsidiary waveguide 80. The amount of vertical mode power transferred from main waveguide 70 to subsidiary waveguide 80 also depends on the angle of the second connection point with respect to the input port 50. Subject to any absorption of energy by the components of the waveguide power divider 100 and/or low amounts of vertical polarization state that may pass through the horizontal polarizers, any vertical mode power that is not directed towards subsidiary output port 65 will be directed towards main output port 60 (and vice versa).

In embodiments, altering the width or height of a portion of the subsidiary waveguide 80 may cause that portion of the subsidiary waveguide 80 to act as a polarizer (e.g., a rectangular waveguide may act as a vertical polarizer), however, this may not be the case for all embodiments. A skilled person understands that modifying the width or height of a waveguide may cause the waveguide to propagate dominant mode (TE10/TE01) and that different shapes of waveguides will have different cutoff frequencies for each of the TE10 and TE01 modes.

If altering the width or height of a portion of the subsidiary waveguide 80 is insufficient to cause that portion of the subsidiary waveguide 80 to act as a polarizer, it will be appreciated that various types of polarizers may be used to permit passage of a second portion of the horizontal polarization state 52 from the first connection point to the subsidiary output port 65 and permit passage of a second portion of the vertical polarization state 62 from the second connection point to the subsidiary output port 65.

By tailoring the geometry of the main waveguide 70 and subsidiary waveguide 80 and the angle of connection between the two, the waveguide power divider 100 may be tuned to emit a main output EM signal 30 and a subsidiary output EM signal 40, each having a different power with respect to one another. In an embodiment, main output EM signal 30 has a higher power than subsidiary output EM signal 40. In an embodiment, subsidiary output EM signal 40 has a higher power than main output EM signal 30.

The horizontal mode of an EM signal comprises and amplitude that is proportional to the horizontal power of that EM signal. Similarly, the vertical mode of an EM signal comprises and amplitude that is proportional to the vertical power of that EM signal. In embodiments, the first portion of the horizontal polarization state 51 and the second portion of the horizontal polarization state 52 each comprise a respective amplitude that differ from one another. In embodiments, the first portion of the vertical polarization state 61 and the second portion of the vertical polarization state 62 each comprise a respective amplitude that differ from one another.

The invention disclosed herein allows the horizontal power distributed between main output port 60 and subsidiary output port 65 to be controlled independently of the vertical power distributed between main output port 60 and subsidiary output port 65. For example, in embodiments, the ratio of the amplitudes of the first portion of horizontal polarization state 51 and second portion of horizontal polarization state 52 differs from the ratio of the amplitudes of the first portion of vertical polarization state 61 and the second portion of vertical polarization state 62.

In embodiments, the ratio of the respective amplitudes of the first portion of horizontal polarization state 51 and second portion of horizontal polarization state 52 is determined, at least in part, by the area of the first horizontal polarizer 91 which occupies a portion of the subsidiary waveguide 80. For example, first horizontal polarizer 91 may be a wire grid horizontal polarizer comprising an area. A waveguide power divider 100 having a wire grid horizontal polarizer with a relatively larger area will distribute more horizontal power to the subsidiary output port 65 (and less horizontal power to main output port 60) as compared to a waveguide power divider 100 having a wire grid horizontal polarizer with a relatively smaller area.

In embodiments, the ratio of the respective amplitudes of the first portion of vertical polarization state 61 and the second portion of vertical polarization state 62 is determined, at least in part, by the area of the first vertical polarizer 92 which occupies a portion of the subsidiary waveguide 80. For example, first vertical polarizer 92 may be a thin film vertical polarizer comprising an area. A waveguide power divider 100 having a thin film vertical polarizer with a relatively larger area will distribute more vertical power to the subsidiary output port 65 (and less vertical power to main output port 60) as compared to a waveguide power divider 100 having a thin film vertical polarizer with a relatively smaller area.

Accordingly, the present invention provides a wide range of dual-mode (vertical mode and horizontal mode) waveguide power dividers capable of unequal power distribution, if desired. The waveguide power dividers disclosed herein may be applicable to a wide range of industries requiring a power distribution network, including in the telecommunication industry.

In particular, the waveguide power dividers disclosed herein may be used in array antennas, for example, a beam steerable antenna. A skilled person will appreciate how to incorporate the waveguide power dividers disclosed herein in communication systems, for example, as part of an antenna.

Figure 2:
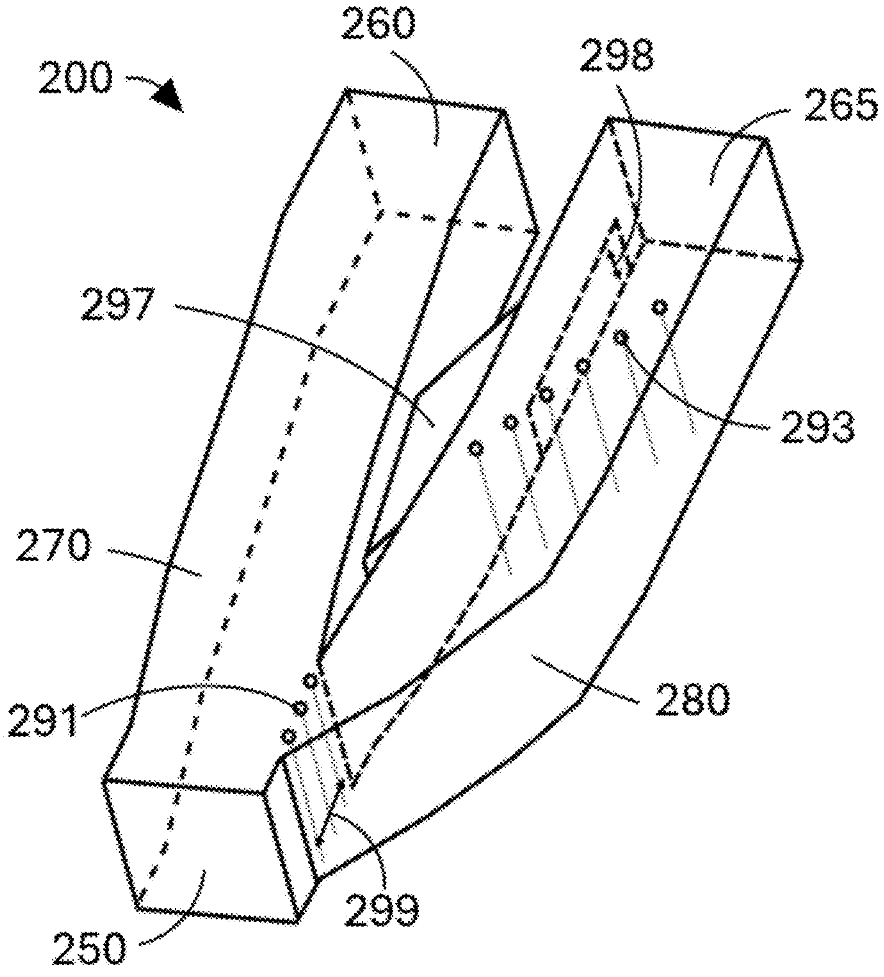
FIG. 2 shows a perspective view of the structure of a simulated waveguide power divider according to some embodiments of the present disclosure.

FIG. 2 shows a perspective view of the structure of a simulated waveguide power divider 200 (according to some embodiments of the present disclosure) on which simulations were conducted (described in greater detail below). Dashed lines show parts of the internal structure of the simulated waveguide power divider 200. The simulations conducted are discussed in greater detail with respect to FIGS. 3A-F and FIGS. 4A-F. However, to assist with the understanding of the simulations, a description of the structure of simulated waveguide power divider 200 will be provided first.

Like waveguide power divider 100, simulated waveguide power divider 200 comprises an input port 250 for receiving and input EM signal (comprising a horizontal polarization state and a vertical polarization state), a main output port 260 for emitting a main output EM signal, and a subsidiary output port 265 for emitting a subsidiary output EM signal. Output EM signal comprises a first portion of the horizontal polarization state and a first portion of the vertical polarization state. Subsidiary output EM signal comprises a second portion of the horizontal polarization state and a second portion of the vertical polarization state.

Main waveguide 270 connects input port 250 to main output port 260. Main waveguide 270 connects to subsidiary waveguide 280 at a first connection point at around first wire grid 291 and at a second connection point at around the entry to rectangular portion 297 of subsidiary waveguide 280. These connection points are referred to “first” and “second” connection points simply to distinguish the connection points. In the simulated waveguide power divider 200, the first connection point is located more proximal to the input port 250 as compared to second connection point, however, this need not be the case. A skilled person will appreciate that the first and second connection points may be located anywhere along the main waveguide 270. Moreover, the main waveguide 270 is a three-dimensional structure and first and second connection points may both be positioned an equal distance from input port 250.

In the simulations described in greater detail below, main waveguide 270 comprises a substantially square cross section throughout of 4.6×4.6 $mm^2$ capable of transmitting both TE10 and TE01 modes, corresponding to vertical and horizontal electric fields, respectively.

Subsidiary waveguide 280 is connected to the main waveguide 270 at the first connection point and the second connection point. The first connection point comprises a width 299 with a first wire grid 291 spanning thereacross. First wire grid 291 comprises a plurality of wires vertically oriented from the top end to the bottom end of simulated waveguide power divider 200. First wire grid 291 acts as a first horizontal polarizer permitting the second portion of the horizontal polarization state of input EM signal to pass from main waveguide 270, through the first connection point, and ultimately out of subsidiary output port 265. First wire grid 291 substantially blocks entry of vertical polarized EM signal from main waveguide 270, through the first connection point, and into subsidiary waveguide 280.

Main waveguide 270 connects to rectangular portion 297 of subsidiary waveguide 280 at a second connection point. A rectangular waveguide conventionally refers to a waveguide having a greater width than height. As discussed in further detail below, FIG. 4A-F show data from simulations conducted on simulated waveguide power divider 200 with rectangular portion 297 of subsidiary waveguide 280 comprising four different heights 298. At all the heights 298 tested, rectangular portion 297 permits varying amounts of vertical polarization state of input EM signal to pass from main waveguide 270, through the second connection point, through the rectangular portion 297 of subsidiary waveguide 280, and ultimately out of subsidiary output port 265. At the same time, the dimensions of rectangular portion 297 (including height 298) substantially prohibits horizontal polarized signal from entering rectangular portion 297. In other words, dimensions of rectangular portion 297 are selected to support only one propagating mode (TE01) and, therefore, rectangular portion 297 of subsidiary waveguide 280 acts as a vertical polarizer.

The skilled person to which this disclosure pertains has the requisite knowledge to design rectangular waveguides to satisfy performance requirements, for example, to block horizontal polarized signal from entering the rectangular waveguide while allowing a desired amount of vertical polarized signal to enter into the rectangular waveguide.

A second wire grid 293, comprising a plurality of wires vertically oriented from the top end to the bottom end of simulated waveguide power divider 200, spans across subsidiary waveguide 280 to the second portion of vertical polarization state from propagating backwardly in the subsidiary waveguide 280 (i.e. towards the first connection point where first wire grid 291 is located).

The second portions of the horizontal and vertical polarization states merge at a junction in the subsidiary waveguide 280 before the subsidiary output port 265 and are emitted through subsidiary output port 265 as a dual mode subsidiary output EM signal (i.e. comprising vertical and polarization states).

Simulations conducted on simulated waveguide power divider 200 will now be described with reference to FIGS. 3A-F and FIGS. 4A-F. All simulations were conducted using CST Microwave Studio (which is part of the CST Studio Suite®).

At a high level, FIGS. 3A-F and FIGS. 4A-F show graphs of various S-parameters, in particular, an S11 parameter, an S21 parameter, and S31 parameter, across a range of frequencies. These S-parameters provide useful information about EM signal propagation through a three-port network, such as simulated waveguide power divider 200. With reference to these S-parameters, input port 250 is “port 1”, main output port 260 is “port 2”, and subsidiary output port 265 is “port 3”. The simulations focused on the frequency range of 37 GHz to 42 GHz (relevant to 6G applications).

The S11 parameter (also referred to as a reflection coefficient) represents the amount of power that is accepted by port 1 (input port 250). An S11 parameter equal to −10 dB indicates that 90 percent of the input EM signal is delivered to port 1 is accepted by port 1. A lower (more negative) S11 value indicates more efficient power transmission through port 1. For practical purposes, an S11 parameter less than −10 dB is generally desired.

The S21 parameter (also referred to as a transmission coefficient) represents the power transferred from port 1 (input port 250) to port 2 (main output port 260). A relatively higher (i.e. less negative) S21 parameter indicates port 2 receives (and radiates) relatively more power. The S31 parameter (also referred to as a transmission coefficient) represents the power transferred from port 1 (input port 250) to port 3 (subsidiary output port 265). A relatively higher (i.e. less negative) S31 parameter indicates port 3 receives (and radiates) relatively more power.

The S11, S21, and S31 parameters can be measures with respect to an H-plane (horizontal polarized EM signal) and a V-plane (vertical polarized EM signal). In the exemplary simulated waveguide power divider 200, main waveguide 270 is designed to transmit more energy than subsidiary waveguide 280. Accordingly, in the exemplary simulated waveguide power divider 200, the S21 parameter (with respect to both the H-plane and V-plane) is greater than the S31 parameter (with respect to both the H-plane and V-plane).

FIGS. 3A-F show graphs of various S-parameters across a range of frequencies using the simulated waveguide power divider 200 of FIG. 2. Each of FIGS. 3A-F show graph four different lines: line A, line B, line C, and line D. Each of lines A-D represent a simulated waveguide power divider 200 having a different width 299 of first connection point. In particular, line A represents a simulated waveguide power divider 200 having a first connection point width 299 of 1.05 millimeters, line B represents a simulated waveguide power divider 200 having a first connection point width 299 of 2.25 millimeters, line C represents a simulated waveguide power divider 200 having a first connection point width 299 of 3.05 millimeters, and line D represents a simulated waveguide power divider 200 having a first connection point width 299 of 3.65 millimeters.

The dimensions of the rectangular portion 297 of subsidiary waveguide 280 for the simulated waveguide power dividers 200 representing each of lines A-D remained constant.

Figure 3A:
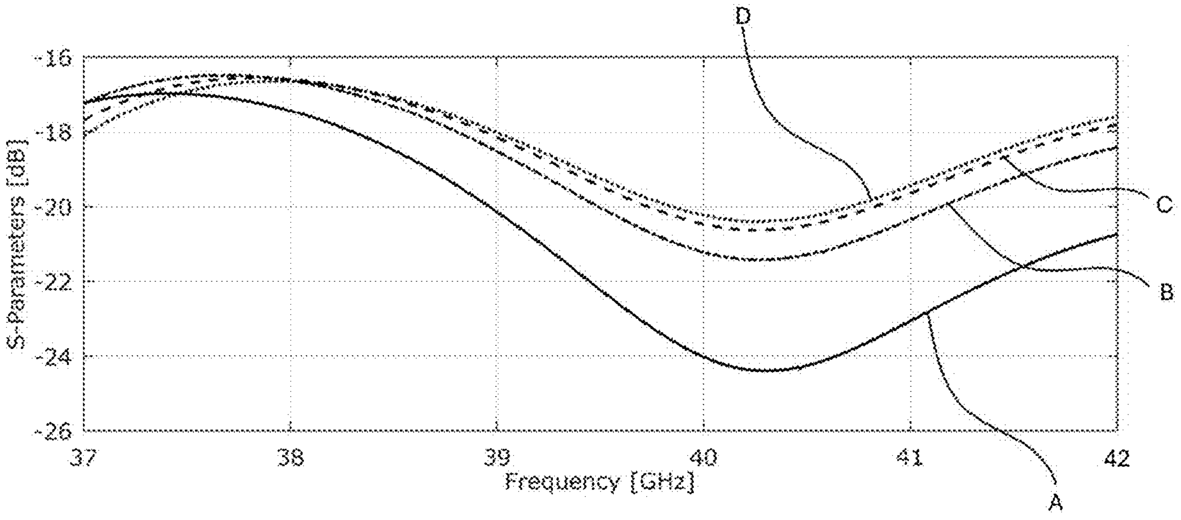
FIG. 3A shows a graph of the S11 parameter of an H-plane across a range of frequencies using the simulated waveguide power divider of FIG. 2 with four different first connection point widths.

FIG. 3A shows a graph of the S11 parameter of an H-plane across a range of frequencies using the simulated waveguide power divider 200 of FIG. 2 with four different first connection point widths 299. As shown in FIG. 3A, lines A-D remained below −15 dB across the tested frequency range. These results indicate that input port 250 (i.e. port 1) of simulated waveguide power divider 200 is capable of accepting large portions of horizontal polarized signal despite changing the width 299 of first connection point.

Figure 3B:
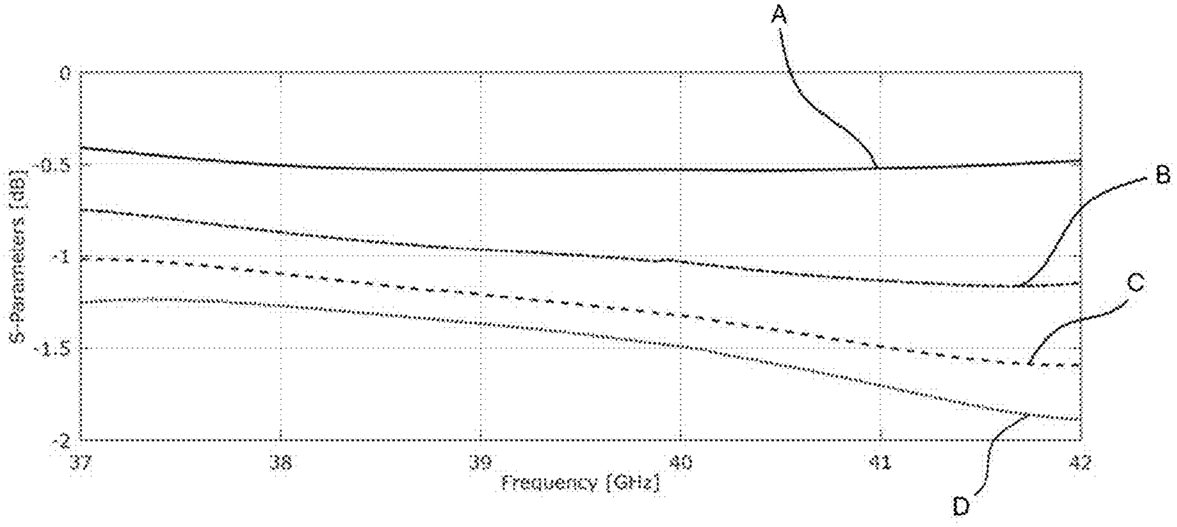
FIG. 3B shows a graph of the S21 parameter of an H-plane across a range of frequencies using the simulated waveguide power divider of FIG. 2 with four different first connection point widths.

FIG. 3B shows a graph of the S21 parameter of an H-plane across a range of frequencies using the simulated waveguide power divider 200 of FIG. 2 with four different first connection point widths 299. As shown in FIG. 3B, the S21 parameter of an H-plane decreases (becomes more negative) as the width 299 of first connection point increases. In other words, relatively more H-plane EM signal is transmitted from port 1 (input port 250) to port 2 (main output port 260) as the width 299 of first connection point decreases.

Figure 3C:
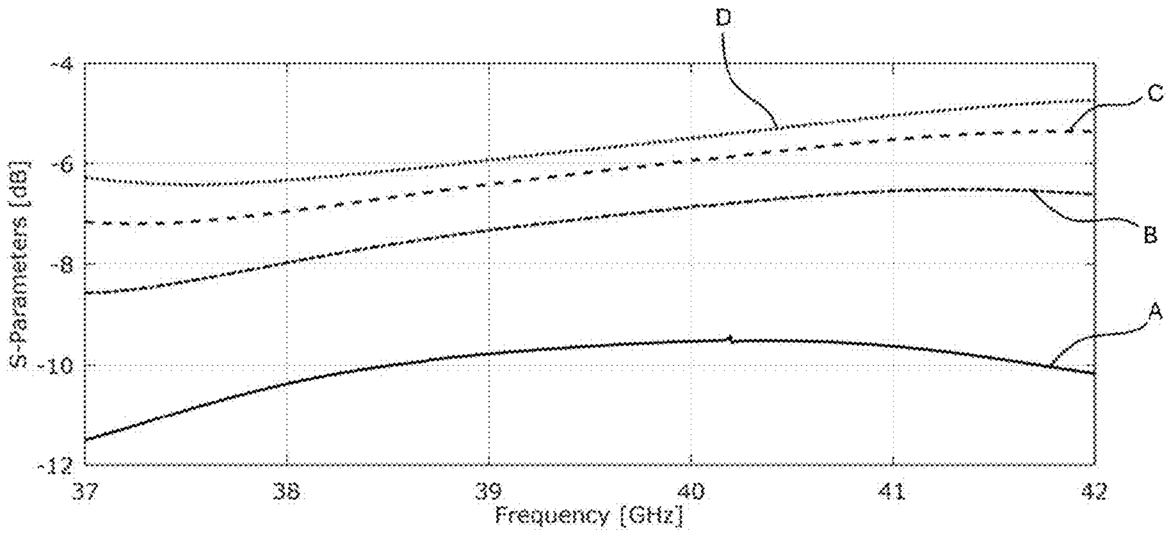
FIG. 3C shows a graph of the S31 parameter of an H-plane across a range of frequencies using the simulated waveguide power divider of FIG. 2 with four different first connection point widths.

FIG. 3C shows a graph of the S31 parameter of an H-plane across a range of frequencies using the simulated waveguide power divider 200 of FIG. 2 with four different first connection point widths 299. As shown in FIG. 3C, the S31 parameter of an H-plane decreases (becomes more negative) as the width 299 of first connection point decreases. In other words, relatively more H-plane EM signal is transmitted from port 1 (input port 250) to port 3 (subsidiary output port 265) as the width 299 of first connection point increases.

Figure 3D:
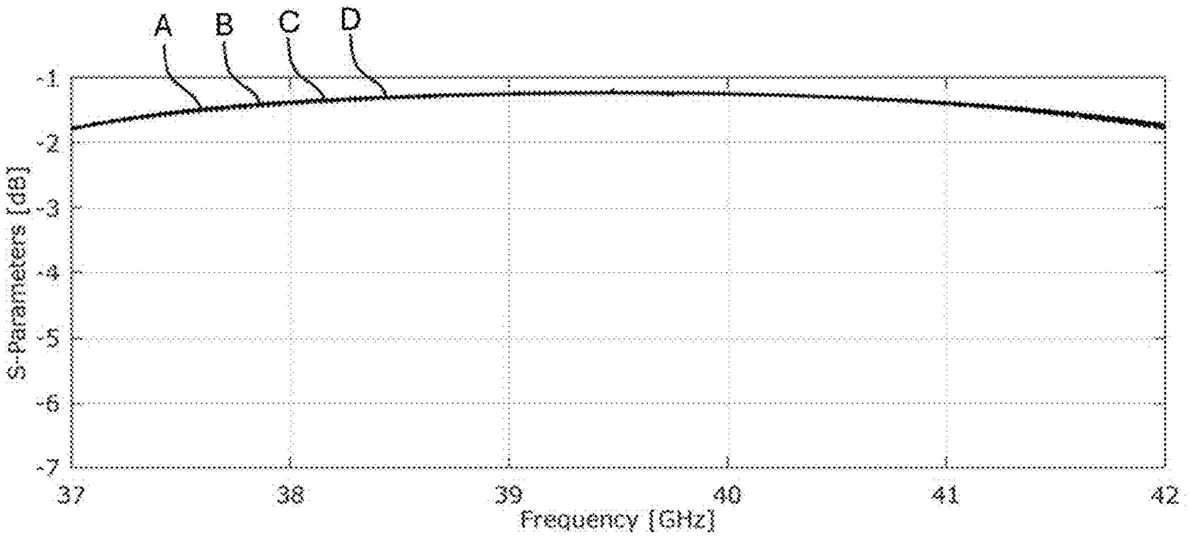
FIG. 3D shows a graph of the S21 parameter of a V-plane across a range of frequencies using the simulated waveguide power divider of FIG. 2 with four different first connection point widths.

FIG. 3D shows a graph of the S21 parameter of a V-plane across a range of frequencies using the simulated waveguide power divider 200 of FIG. 2 with four different first connection point widths 299. As shown in FIG. 3D, lines A-D substantially overlap across the tested frequency range indicating that vertical polarized power transferred from port 1 (input port 250) to port 3 (subsidiary output port 265) does not substantially change as the width 299 of first connection point varies.

Figure 3E:
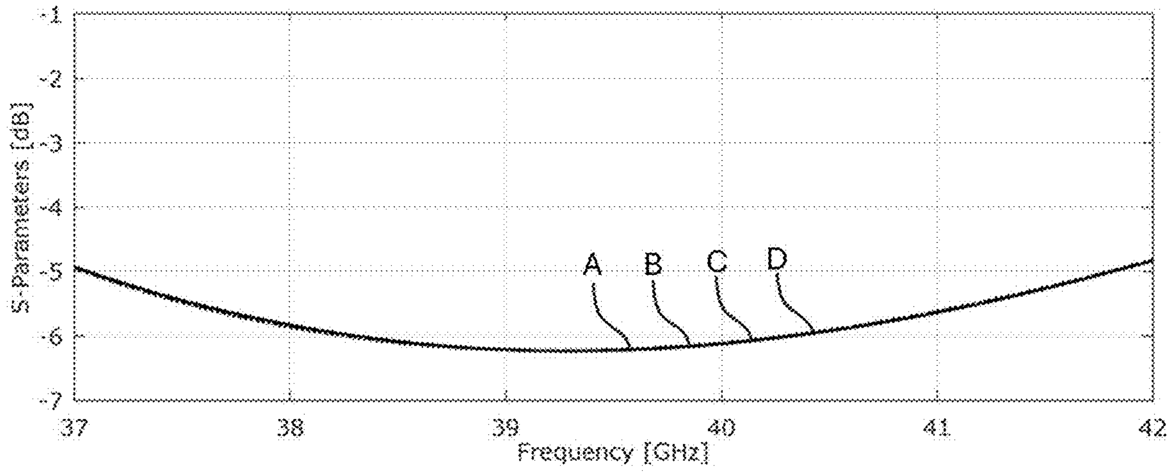
FIG. 3E shows a graph of the S31 parameter of a V-plane across a range of frequencies using the simulated waveguide power divider of FIG. 2 with four different first connection point widths.

FIG. 3E shows a graph of the S31 parameter of a V-plane across a range of frequencies using the simulated waveguide power divider 200 of FIG. 2 with four different first connection point widths 299. As shown in FIG. 3E, lines A-D substantially overlap across the tested frequency range indicating that vertical polarized power transferred from port 1 (input port 250) to port 2 (main output port 260) does not substantially change as the width 299 of first connection point varies.

Accordingly, FIGS. 3D and 3E indicate that, as the width 299 of first connection point varies, the H-plane power ratio distributed to port 2 (main output port 260) and port 3 (subsidiary output port 265) changes while the V-plane power ratio distributed to port 2 (main output port 260) and port 3 (subsidiary output port 265) remains stable. Thus, the waveguide power dividers disclosed herein can split the horizontal mode independent of the vertical mode.

Figure 3F:
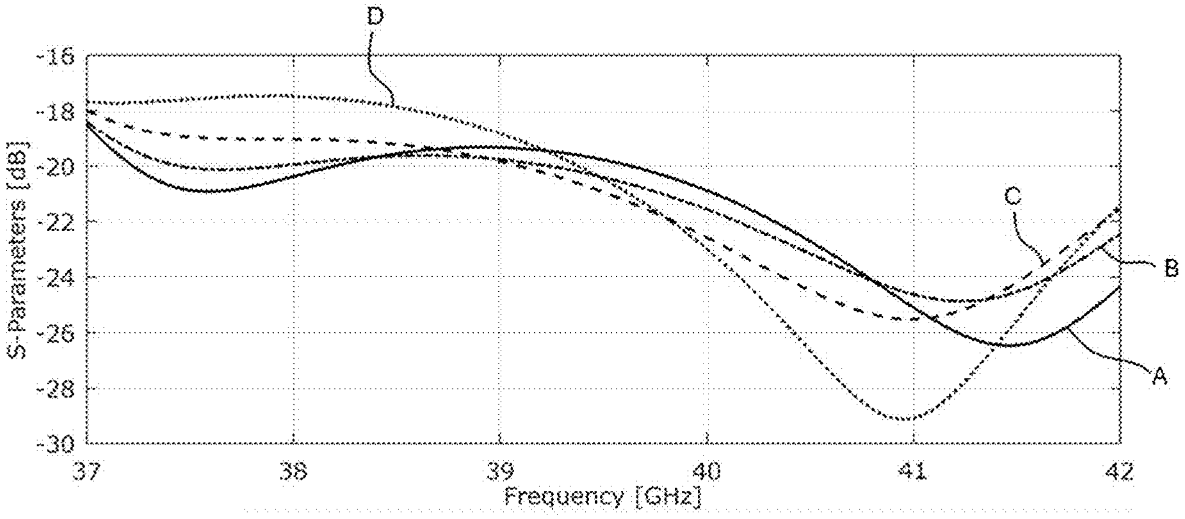
FIG. 3F shows a graph of the S11 parameter of a V-plane across a range of frequencies using the simulated waveguide power divider of FIG. 2 with four different first connection point widths.

FIG. 3F shows a graph of the S11 parameter of a V-plane across a range of frequencies using the simulated waveguide power divider 200 of FIG. 2 with four different first connection point widths 299. As shown in FIG. 3F, lines A-D remained below −15 dB across the tested frequency range. These results indicate that input port 250 (i.e. port 1) of simulated waveguide power divider 200 is capable of accepting large portions of vertical polarized signal despite changing the width 299 of first connection point.

In sum, the simulated data displayed in FIGS. 3A-F illustrate that changing width 299 can alter the ratio of horizontal polarized energy distributed to main output port 260 and subsidiary output port 265 with substantially no impact on the proportion of vertical polarized energy distributed to out of main output port 260 and subsidiary output port 265. Accordingly, arbitrary H-plane ratios between main output port 260 and subsidiary output port 265 may be obtained while maintaining stable V-plane power ratios. Furthermore, for all widths 299 tested, the simulated waveguide power divider 200 exhibited excellent S11 parameter values (below −15 dB) throughout the tested frequency ranges (for both horizontal and vertical polarization states).

FIGS. 4A-F show graphs of various S-parameters across a range of frequencies using the simulated waveguide power divider 200 of FIG. 2. Each of FIGS. 4A-F show graph four different lines: line E, line F, line G, and line H. Each of lines E-H represent a simulated waveguide power divider 200 having a different height 298 of rectangular portion 297 of subsidiary waveguide 280. In particular, line E represents a simulated waveguide power divider 200 having a rectangular portion 297 comprising a height 298 of 0.25 millimeters, line F represents a simulated waveguide power divider 200 having a rectangular portion 297 comprising a height 298 of 0.85 millimeters, line G represents a simulated waveguide power divider 200 having a rectangular portion 297 comprising a height 298 of 1.45 millimeters, and line H represents a simulated waveguide power divider 200 having a rectangular portion 297 comprising a height 298 of 1.85 millimeters.

The dimensions of the width 299 of the first connection point between main waveguide 270 and subsidiary waveguide 280 for the simulated waveguide power dividers 200 representing each of lines E-H remained constant.

Figure 4A:
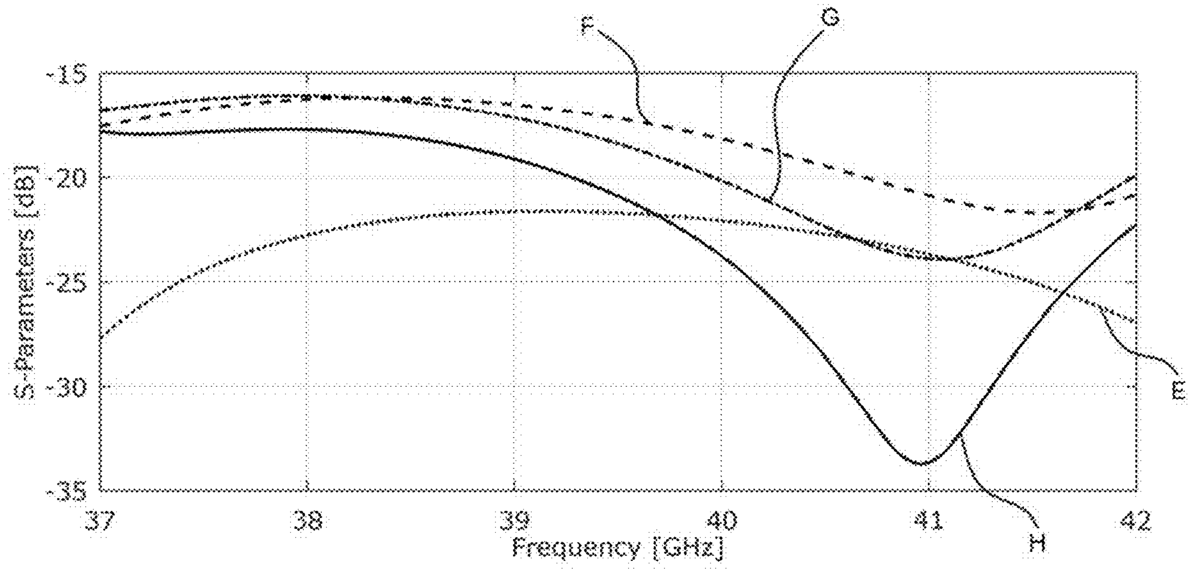
FIG. 4A shows a graph of the S11 parameter of a V-plane across a range of frequencies using the simulated waveguide power divider of FIG. 2 with rectangular portion of subsidiary waveguide comprising four different heights.

FIG. 4A shows a graph of the S11 parameter of a V-plane across a range of frequencies using the simulated waveguide power divider 200 of FIG. 2 with rectangular portion 297 of subsidiary waveguide 280 comprising four different heights 298. As shown in FIG. 4A, lines E-H remained below −15 dB across the tested frequency range. These results indicate that input port 250 (i.e. port 1) of simulated waveguide power divider 200 is capable of accepting large portions of vertical polarized signal despite changing the height 298 of rectangular portion 297.

Figure 4B:
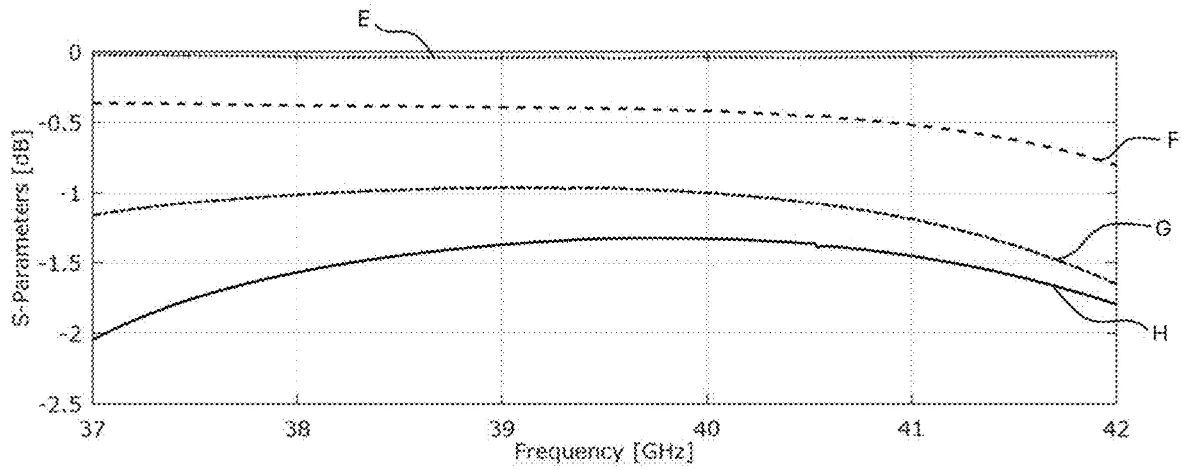
FIG. 4B shows a graph of the S21 parameter of a V-plane across a range of frequencies using the simulated waveguide power divider of FIG. 2 with rectangular portion of subsidiary waveguide comprising four different heights.

FIG. 4B shows a graph of the S21 parameter of a V-plane across a range of frequencies using the simulated waveguide power divider 200 of FIG. 2 with rectangular portion 297 of subsidiary waveguide 280 comprising four different heights 298. As shown in FIG. 4B, the S21 parameter of a V-plane decreases (becomes more negative) as the height 298 of rectangular portion 297 increases. In other words, relatively more V-plane EM signal is transmitted from port 1 (input port 250) to port 2 (main output port 260) as the height 298 of rectangular portion 297 decreases.

Figure 4C:
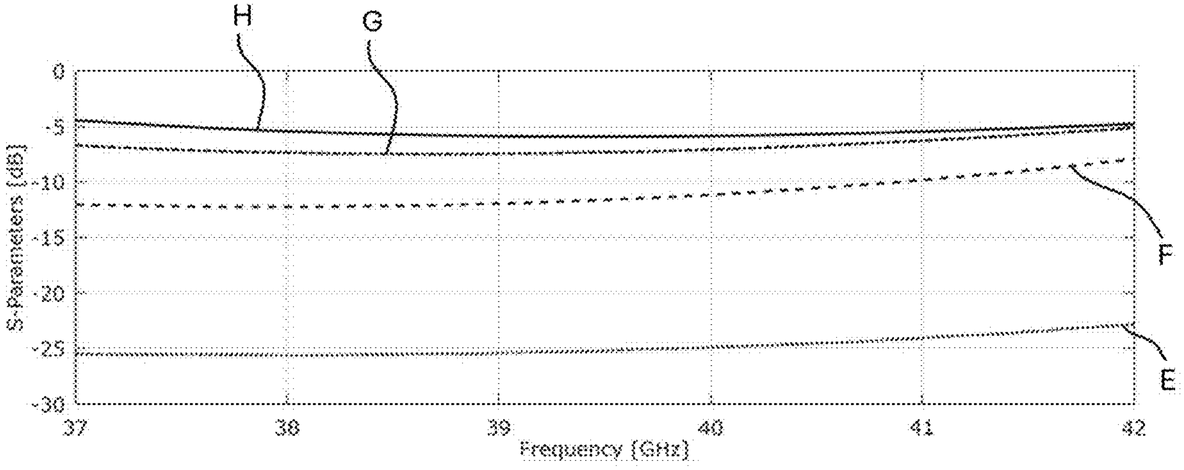
FIG. 4C shows a graph of the S31 parameter of a V-plane across a range of frequencies using the simulated waveguide power divider of FIG. 2 with rectangular portion of subsidiary waveguide comprising four different heights.

FIG. 4C shows a graph of the S31 parameter of a V-plane across a range of frequencies using the simulated waveguide power divider 200 of FIG. 2 with rectangular portion 297 of subsidiary waveguide 280 comprising four different heights 298. As shown in FIG. 4C, the S31 parameter of a V-plane decreases (becomes more negative) as the height 298 of rectangular portion 297 increases decreases. In other words, relatively more V-plane EM signal is transmitted from port 1 (input port 250) to port 3 (subsidiary output port 265) as the height 298 of rectangular portion 297 increases.

Figure 4D:
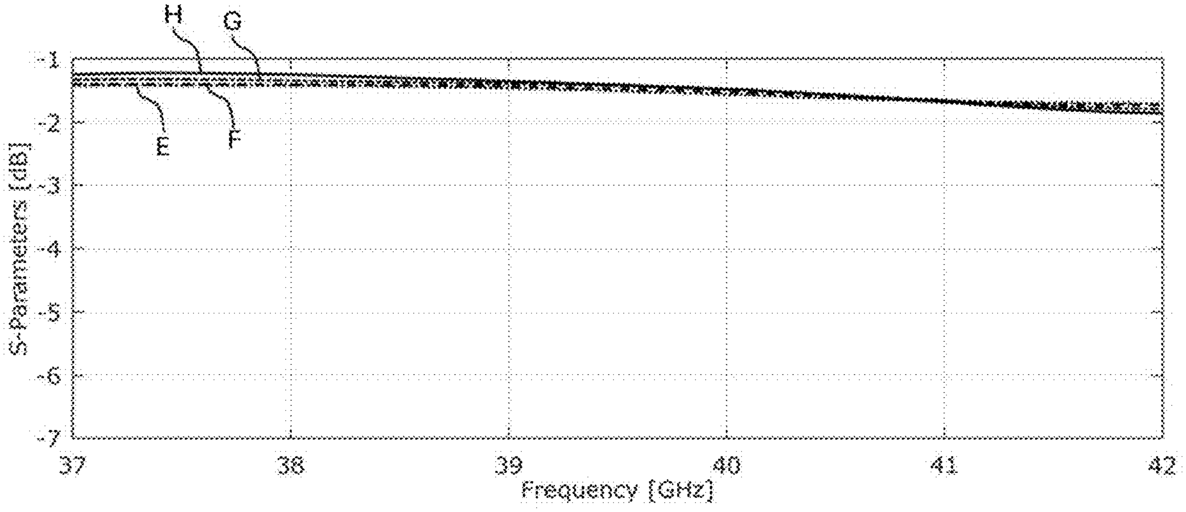
FIG. 4D shows a graph of the S21 parameter of an H-plane across a range of frequencies using the simulated waveguide power divider of FIG. 2 with rectangular portion of subsidiary waveguide comprising four different heights.

FIG. 4D shows a graph of the S21 parameter of an H-plane across a range of frequencies using the simulated waveguide power divider 200 of FIG. 2 with rectangular portion 297 of subsidiary waveguide 280 comprising four different heights 298. As shown in FIG. 4D, lines E-H do not substantially vary across the tested frequency range indicating that horizontal polarized power transferred from port 1 (input port 250) to port 3 (subsidiary output port 265) does not substantially change as the height 298 of rectangular portion 297 of subsidiary waveguide 280 varies.

Figure 4E:
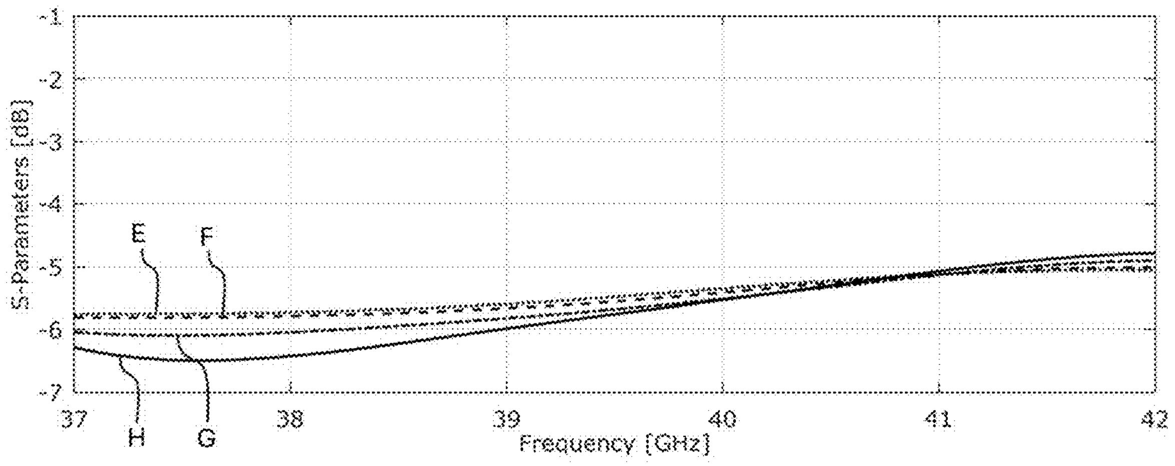
FIG. 4E shows a graph of the S31 parameter of an H-plane across a range of frequencies using the simulated waveguide power divider of FIG. 2 with rectangular portion of subsidiary waveguide comprising four different heights.

FIG. 4E shows a graph of the S31 parameter of an H-plane across a range of frequencies using the simulated waveguide power divider 200 of FIG. 2 with rectangular portion 297 of subsidiary waveguide 280 comprising four different heights 298. As shown in FIG. 4E, lines E-H substantially overlap across the tested frequency range indicating that horizontal polarized power transferred from port 1 (input port 250) to port 2 (main output port 260) does not substantially change as the height 298 of rectangular portion 297 of subsidiary waveguide 280 varies.

Accordingly, FIGS. 4D and 4E indicate that, as the height 298 of rectangular portion 297 of subsidiary waveguide 280 varies, the V-plane power ratio distributed to port 2 (main output port 260) and port 3 (subsidiary output port 265) changes while the H-plane power ratio distributed to port 2 (main output port 260) and port 3 (subsidiary output port 265) remains stable. Thus, the waveguide power dividers disclosed herein can split the vertical mode independent of the horizontal mode.

Figure 4F:
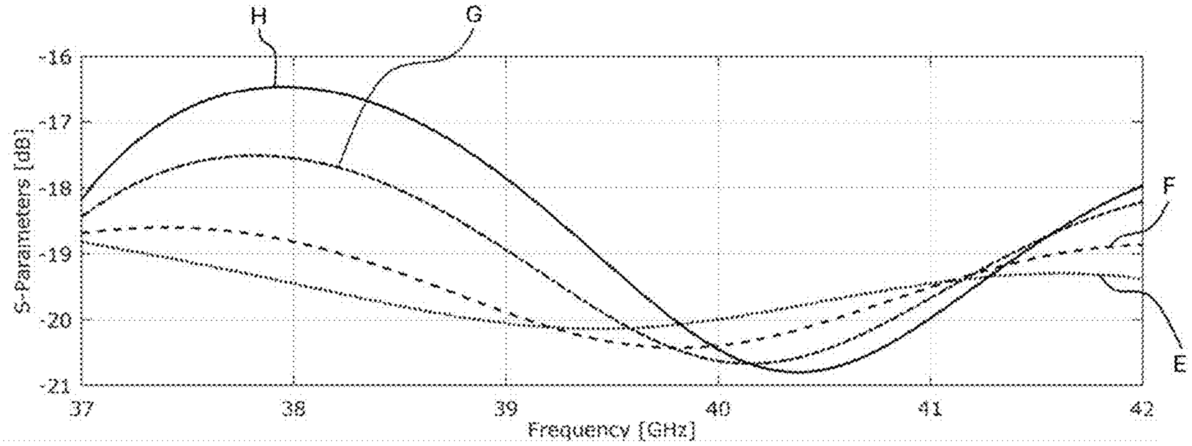
FIG. 4F shows a graph of the S11 parameter of an H-plane across a range of frequencies using the simulated waveguide power divider of FIG. 2 with rectangular portion of subsidiary waveguide comprising four different heights.

FIG. 4F shows a graph of the S11 parameter of an H-plane across a range of frequencies using the simulated waveguide power divider 200 of FIG. 2 with rectangular portion 297 of subsidiary waveguide 280 comprising four different heights 298. As shown in FIG. 4F, lines E-H remained below −15 dB across the tested frequency range. These results indicate that input port 250 (i.e. port 1) of simulated waveguide power divider 200 is capable of accepting large portions of horizontal polarized signal despite changing the height 298 of rectangular portion 297 of subsidiary waveguide 280.

In sum, the simulated data displayed in FIGS. 4A-F illustrate that changing height 298 can alter the ratio of vertical polarized energy distributed to main output port 260 and subsidiary output port 265 with substantially no impact on the proportion of horizontal polarized energy distributed to main output port 260 and subsidiary output port 265. Accordingly, arbitrary V-plane power ratios between main output port 260 and subsidiary output port 265 may be obtained while maintaining stable H-plane power ratios. Furthermore, for all heights 298 tested, the simulated waveguide power divider 200 exhibited excellent S11 parameter values (below −15 dB) throughout the tested frequency ranges (for both horizontal and vertical polarization states).

Given the simulations disclosed herein, a skilled person will appreciate that the width 299 of first connection point and the height 298 of rectangular portion 297 of subsidiary waveguide 280 can both be altered to achieve arbitrary H-plane and V-plane power ratios between main output port 260 and subsidiary output port 265. Furthermore, a skilled person will appreciate that other the rectangular portion 297 of subsidiary waveguide 280 may be replaced with a different type of vertical polarizer and the first wire grid 291 and second wire grid 293 may be replaced with a different type of horizontal polarizer.

The simulations disclosed herein provide a proof of concept for the subject matter disclosed herein, however, it is believed that further optimization of parameters affecting the performance of simulated waveguide power divider 200 could result in even more superior results.

In light of the above, a skilled person will appreciate how to design and manufacture a wide range of waveguide power divider capable of dividing power among two output ports, including dividing H-plane and V-plane power unequally to satisfy performance requirements.

In the present disclosure, all terms referred to in singular form are meant to encompass plural forms of the same. Likewise, all terms referred to in plural form are meant to encompass singular forms of the same.

As used herein, the term "about" refers to an approximately +/−10% variation from a given value. It is to be understood that such a variation is always included in any given value provided herein, whether or not it is specifically referred to.

The apparatuses and/or methods disclosed herein may be described in terms of "comprising," "containing," or "including" various components or steps—these terms are to be understood as "including, but not limited to". Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b", or the like) disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The present disclosure is well adapted to attain the ends and advantages mentioned herein as well as those that are inherent. The particular embodiments disclosed above are illustrative only, as the present disclosure may be modified and practiced in different but equivalent manners apparent to those skilled in the art having the benefit of the teachings herein. Although individual embodiments are discussed, where possible (as would be understood by a skilled person), the disclosure covers all combinations of all those embodiments. No limitations are intended to the details of construction or design herein shown. The drawings included in this disclosure are merely exemplary of the invention disclosed herein and items shown in any given figure may not be proportionate to one another.

Unless defined otherwise, all terms used herein (including in the claims) have the same meaning as commonly understood by one of ordinary skill in the art to which the disclosure pertains. If there is any conflict in the usages of a word or term in this specification and one or more patent(s) or other documents that may be referenced herein, the definitions that are consistent with this specification should be adopted.

The illustrative (i.e. exemplary) embodiments disclosed above may be altered or modified and all such variations are considered within the scope of the present disclosure. Many obvious variations of the embodiments set out herein will suggest themselves to those skilled in the art having the benefit of the present disclosure. Such obvious variations are within the full intended scope of the appended claims.

The invention claimed is:

1. A waveguide power divider comprising:

(a) an input port for receiving an input electromagnetic (EM) signal comprising a horizontal polarization state and a vertical polarization state;

(b) a main output port for emitting a main output EM signal;

(c) a main waveguide extending between the input port and the main output port, the main waveguide for transmitting a first portion of the horizontal polarization state and a first portion of the vertical polarization state from the input port to the main output port, the main waveguide comprising a square cross-section;

(d) a subsidiary output port for emitting a subsidiary output EM signal;

(e) a subsidiary waveguide connected to the main waveguide at a first connection point and at a second connection point, the subsidiary waveguide extending between the first connection point, the second connection point, and the subsidiary output port;

(f) a first horizontal polarizer for permitting passage of a second portion of the horizontal polarization state from the first connection point to the subsidiary output port and for preventing passage of the vertical polarization state from the first connection point to the subsidiary output port; and (g) a first vertical polarizer for permitting passage of a second portion of the vertical polarization state from the second connection point to the subsidiary output port and for preventing passage of the horizontal polarization state from the second connection point to the subsidiary output port.

2. The waveguide power divider of claim 1, wherein, when the input port receives the input EM signal:

the first portion of the horizontal polarization state and the first portion of the vertical polarization state are emitted out of the main output port as the main output EM signal;

the second portion of the horizontal polarization state and the second portion of the vertical polarization state are emitted out of the subsidiary output port as the subsidiary output EM signal; and the main output EM signal and the subsidiary output EM signal comprise a respective power that differ from one another.

3. The waveguide power divider of claim 1, wherein the first portion of the horizontal polarization state and the second portion of the horizontal polarization state each comprise a respective amplitude that differ from one another.

4. The waveguide power divider of claim 1, wherein the first portion of the vertical polarization state and the second portion of the vertical polarization state each comprise a respective amplitude that differ from one another.

5. The waveguide power divider of claim 1, wherein:

the first and second portions of the horizontal and vertical polarization states each comprise a respective amplitude; and the ratio of the amplitudes of the first and second portions of the horizontal polarization state differs from the ratio of the amplitudes of the first and second portions of the vertical polarization state.

6. The waveguide power divider of claim 1, wherein:

the first horizontal polarizer comprises an area;

the first and second portions of the horizontal polarization state each comprise a respective amplitude; and the ratio of the respective amplitudes of the first and second portions of the horizontal polarization state is determined, at least in part, by the area of the first horizontal polarizer.

7. The waveguide power divider of claim 1, wherein:

the first vertical polarizer comprises an area;

the first and second portions of the vertical polarization state each comprise a respective amplitude; and the ratio of the respective amplitudes of the first and second portions of the vertical polarization state is determined, at least in part, by the area of the first vertical polarizer.

8. The waveguide power divider of claim 1, wherein, when the input port receives the input EM signal:

the second portion of the horizontal polarization state passes through the first horizontal polarizer to a junction in the subsidiary waveguide;

the second portion of the vertical polarization state passes through the first vertical polarizer to the junction in the subsidiary waveguide; and the second portion of the horizontal polarization state and the second portion of the vertical polarization state merge at the junction and are emitted out the subsidiary output port as the subsidiary output EM signal.

9. The waveguide power divider of claim 8, wherein:

the second portions of the horizontal and vertical polarization states each travel a respective same distance from the input port to the junction; and the subsidiary output EM signal comprises a horizontal phase slope and a vertical phase slope that are identical.

10. The waveguide power divider of claim 8, wherein:

the first horizontal polarizer occupies the first connection point;

the first vertical polarizer occupies the second connection point; and the subsidiary waveguide further comprises:

a first branch extending between the first connection point and a first intersection with the junction;

a second branch extending between the second connection point and a second intersection with the junction;

a second horizontal polarizer occupying the first intersection, the second horizontal polarizer for preventing the second portion of the vertical polarization state from passing into the first branch; and a second vertical polarizer occupying the second intersection, the second vertical polarizer for preventing the second portion of the horizontal polarization state from passing into the second branch.

11. The waveguide power divider of claim 1, wherein the first horizontal polarizer is a wire grid.

12. The waveguide power divider of claim 1, wherein the first vertical polarizer is a portion of the subsidiary waveguide comprising a rectangular waveguide.

13. The waveguide power divider of claim 1, wherein the input EM signal comprises a frequency between about 9 kilohertz to about 300 gigahertz.

14. The waveguide power divider of claim 1, further comprising an S11 parameter less than or equal to about −15 decibels.

15. The waveguide power divider of claim 1, further comprising:

an H-plane S31 parameter and an H-plane S21 parameter;

a V-plane S31 parameter and a V-plane S21 parameter; and the first horizontal polarizer and the first vertical polarizer each comprise a respective area;

wherein:

the H-plane S31 parameter and H-plane S21 parameter depend on the area of the first horizontal polarizer; and the V-plane S31 parameter and V-plane S21 parameter depend on the area of the first vertical polarizer.

16. The waveguide power divider of claim 1, wherein the input port faces a first direction and the main and subsidiary output ports face a second direction opposite the first direction.

17. The waveguide power divider of claim 1 manufactured as a single component using a three-dimensional metal printer.

18. An array antenna comprising at least one waveguide power divider of claim 1.

19. An array antenna comprising at least one waveguide power divider of claim 2.

20. An array antenna comprising at least one waveguide power divider of claim 3.

* * * * *